(12) United States Patent
Patel

(10) Patent No.: US 7,196,039 B2
(45) Date of Patent: Mar. 27, 2007

(54) METHODS OF REDUCING FLUID LOSS IN A WELLBORE SERVICING FLUID

(75) Inventor: Bharat B. Patel, Bartlesville, OK (US)

(73) Assignee: Chevron Philips Chemical Company LP, The Woodlands, TX (US)

( * ) Notice: Subject to any disclaimer, the term of this patent is extended or adjusted under 35 U.S.C. 154(b) by 355 days.

(21) Appl. No.: 10/733,059

(22) Filed: Dec. 11, 2003

(65) Prior Publication Data

US 2005/0130849 A1    Jun. 16, 2005

(51) Int. Cl.
- C09K 8/24 (2006.01)
- C09K 8/487 (2006.01)
- C09K 8/76 (2006.01)
- C09K 8/88 (2006.01)

(52) U.S. Cl. .................. 507/121; 507/123; 507/141; 507/226; 507/229; 507/277; 507/935; 166/295

(58) Field of Classification Search ............. 507/219, 507/226, 221, 225, 121, 123, 229; 166/283
See application file for complete search history.

(56) References Cited

U.S. PATENT DOCUMENTS

| | | | |
|---|---|---|---|
| 3,547,899 A | 12/1970 | Arlt et al. ............... 260/79.3 |
| 4,502,965 A | 3/1985 | Giddings et al. | |
| 4,578,201 A * | 3/1986 | Burns et al. ............ 507/225 |
| 4,743,383 A * | 5/1988 | Stewart et al. ......... 507/110 |
| 5,098,836 A | 3/1992 | Stahl et al. ............. 435/121 |
| 5,124,376 A | 6/1992 | Clark, Jr. ............... 523/336 |
| 5,135,909 A | 8/1992 | Stephens et al. ....... 507/121 |
| 5,380,705 A | 1/1995 | Stephens et al. ....... 507/121 |
| 5,607,618 A * | 3/1997 | Antwerpen et al. .... 510/302 |
| 5,849,674 A * | 12/1998 | Fox et al. ............... 507/140 |
| 6,030,928 A | 2/2000 | Stahl et al. | |
| 6,124,244 A * | 9/2000 | Murphey ................ 507/111 |
| 6,124,245 A | 9/2000 | Patel ...................... 507/120 |
| 6,136,935 A | 10/2000 | Udarbe et al. .......... 526/312 |
| 6,176,315 B1 * | 1/2001 | Reddy et al. .......... 166/295 |
| 6,380,137 B1 * | 4/2002 | Heier et al. ............ 507/121 |
| 2003/0008779 A1 | 1/2003 | Chen et al. | |
| 2003/0094122 A1 | 5/2003 | Eoff et al. | |
| 2003/0181543 A1 | 9/2003 | Reddy et al. | |

FOREIGN PATENT DOCUMENTS

EP    0256797    2/1988

OTHER PUBLICATIONS

International Search Report and Written Opinion of the International Searching Authority, PCT/US2004/037007, Jan. 4, 2005, 12 pgs.

* cited by examiner

Primary Examiner—Randy Gulakowski
Assistant Examiner—John J. Figueroa
(74) Attorney, Agent, or Firm—Conley Rose, P.C.; Rodney B. Carroll; Kimberly L. Brown

(57) ABSTRACT

Methods of reducing the fluid loss from a wellbore servicing fluid include combining a terpolymer with the wellbore servicing fluid to reduce the fluid loss from the fluid, followed by displacing the fluid into a wellbore. In an embodiment, the following monomers are used to make the terpolymer: from about 75 wt. % to about 95 wt. % of 2-acrylamido-2-methylpropanesulfonic acid or an alkali salt thereof; from about 3 wt. % to about 15 wt. % of acrylamide; and from about 3 wt. % to about 15 wt. % of N-vinyl-2-pyrrolidone, all weight percentages being based on a total weight of the monomers. The wellbore servicing fluid may comprise water or an aqueous salt solution such as a formate solution. The wellbore servicing fluid may also comprise clay such as montmorillonite and attapulgite clay.

16 Claims, No Drawings

METHODS OF REDUCING FLUID LOSS IN A WELLBORE SERVICING FLUID

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention relates to fluids and methods for use in the oil industry, and more particularly to wellbore servicing fluids comprising a water-based fluid and a terpolymer for reducing fluid loss from the fluid and methods of reducing fluid loss by using such a terpolymer.

BACKGROUND OF THE INVENTION

Subterranean deposits of natural resources such as gas, water, and crude oil are commonly recovered by drilling wellbores to tap subterranean formations or zones containing such deposits. Various water-based fluids are employed in drilling a wellbore and preparing the wellbore and an adjacent subterranean formation for the recovery of material therefrom. For example, a drilling fluid or mud is usually circulated through a wellbore as it is being drilled to cool the bit, keep deposits confined to their respective formations during the drilling process, and bring drill cuttings to the surface. The drilling fluid also has the ability to form an impermeable filter cake upon the walls of the wellbore, thus preventing water from migrating from the fluid into the subterranean formation. Other types of water-based fluids include a fracturing fluid that is usually used to create fractures in the subterranean formation to thereby increase the recovery of material from the formation. Moreover, a sweeping fluid may be used to flood the subterranean formations, thereby driving oil, gas, or water from the formation into a production wellbore for recovery, and a work-over fluid may be used to perform remedial work in the wellbore.

Unfortunately, fluid loss from such water-based fluids often occurs in the wellbore, resulting in severe problems. For example, an excessive amount of filter cake may build-up on the walls of the wellbore, causing the drill pipe to become stuck such that it is very difficult to remove it from the wellbore. Also, the fluid loss may lead to sloughing and caving in of shale formations. Further, electrical logging of the wellbore can be adversely affected due to the fluid loss.

Various natural and synthetic polymers are commonly added to water-based fluids to control fluid loss from the fluids into subterranean formations. However, some wellbores into which the water-based fluids are pumped have relatively high downhole temperatures and/or pressures at which traditional fluid loss control agents are unstable. As such, those fluid loss control agents may fail to serve their purpose of providing fluid loss control downhole. Therefore, a need exists to develop a fluid loss control agent that reduces fluid loss at high temperatures and pressures.

SUMMARY OF THE INVENTION

In an embodiment, methods of reducing the fluid loss from a wellbore servicing fluid include combining a terpolymer with the wellbore servicing fluid to reduce the fluid loss from the fluid. The terpolymer may be made from the following monomers:

(a) from about 75% to about 95% of a first monomer by total weight of the monomers, the first monomer being generally represented by the following formula:

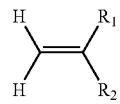

wherein $R_1$ is selected from the group consisting of hydrogen and methyl groups, wherein $R_2$ is selected from the group consisting of sulfo, sulfophenyl, sulfoalkyl, sulfoalkyl amido, and alkali salts thereof, wherein alkylene and alkyl groups of the $R_2$ comprise from 1 to 4 carbon atoms, and wherein the alkali salt is a salt of a cation selected from the group consisting of sodium, potassium, and ammonium;

(b) from about 3% to about 15% of a second monomer by total weight of the monomers, the second monomer being generally represented by the following formula:

wherein $R_3$ is selected from the group consisting of hydrogen, methyl, and ethyl groups, wherein $R_4$ is selected from the group consisting of N-alkyl substituted amide, N,N-dialkyl substituted amide, carboxyl alkylene amine, carboxyl alkylene methyl amine, carboxyl alkylene dimethyl amine, pyrrolidonyl, formamide, and acetamido groups, wherein an alkyl group of the N-alkyl substituted amide is selected from the group consisting of methyl, ethyl, and propyl groups, wherein an alkyl group of the N,N-dialkyl substituted amide is selected from the group consisting of methyl and ethyl groups, and wherein an alkylene group of the $R_4$ includes 1 to 5 carbon atoms; and (c) from about 3% to about 15% of a third monomer by total weight of the monomers, the third monomer being generally represented by the following formula:

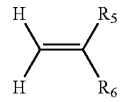

wherein $R_5$ is selected from the group consisting of hydrogen and methyl groups, and wherein $R_6$ is selected from the group consisting of amide, nitrile, acetyl, and pyridinyl groups. In an embodiment, the first monomer comprises 2-acrylamido-2-methylpropanesulfonic acid or an alkali salt thereof, the second monomer comprises N-vinyl-2-pyrrolidone, and the third monomer comprises acrylamide. The wellbore servicing fluid may serve as, for example, a drilling fluid, a work-over fluid, a fracturing fluid, a sweeping fluid, or combinations thereof and thus may be displaced into a wellbore in contact with a subterranean formation. The fluid loss in the wellbore may be controlled even if it has a temperature up to about 450° F. and/or a pressure up to about 30,000 psi.

In another embodiment, wellbore servicing fluids comprise a water-based fluid such as a formate solution and the foregoing terpolymer for reducing fluid loss from the fluid. The terpolymer can be formed from the following monomers: from about 75 wt. % to about 95 wt. % of 2-acrylamido-2-methylpropanesulfonic acid or an alkali salt thereof such as sodium 2-acrylamido-2-methylpropanesulfonate; from about 3 wt. % to about 15 wt. % of N-vinyl-2-pyrrolidone; and from about 3 wt. % to about 15 wt. % of acrylamide, all weight percentages being based on a total weight of the monomers. Further, the water based fluid may comprise fresh water or an aqueous salt solution such as a KCl, NaCl, K-formate, or Na-formate solution. It may also comprise clay such as montmorillonite clay and attapulgite clay.

DETAILED DESCRIPTION OF THE PREFERRED EMBODIMENTS

In accordance with an embodiment, a wellbore servicing fluid includes a water-based fluid and a terpolymer for reducing fluid loss from the fluid. As used herein "wellbore servicing fluid" refers to a fluid that may be used to prepare a wellbore or a subterranean formation penetrated by the wellbore for the recovery of material from the formation. Thus, the wellbore servicing fluid may serve as, for example, a drilling fluid, a work-over fluid, a fracturing fluid, or a sweeping fluid. It is understood that "subterranean formation" encompasses both areas below exposed earth or areas below earth covered by water such as sea or ocean water.

The wellbore servicing fluid contains a balance of the water-based fluid after taking other components of the wellbore servicing fluid into account. The water-based fluid may, for example, comprise fresh water or salt water, e.g., brines and sea water. Examples of suitable water-based fluids include aqueous salt solutions such as sodium chloride (NaCl), potassium chloride (KCl), potassium nitrate (KNO$_3$), sea salt, and formate solutions, e.g., potassium formate, cesium formate, and sodium formate solutions.

The terpolymer can be made by polymerizing the following three monomers:

(a) from about 75% to about 95% of a first monomer by total weight of the monomers, the first monomer being generally represented by the following formula:

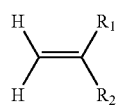

wherein $R_1$ is selected from the group consisting of hydrogen and methyl groups, wherein $R_2$ is selected from the group consisting of sulfo, sulfophenyl, sulfoalkyl, sulfoalkyl amido, and alkali salts thereof, wherein alkylene and alkyl groups of the $R_2$ comprise from 1 to 4 carbon atoms, and wherein the alkali salt is a salt of a cation selected from the group consisting of sodium, potassium, and ammonium;

(b) from about 3% to about 15% of a second monomer by total weight of the monomers, the second monomer being generally represented by the following formula:

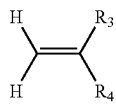

wherein $R_3$ is selected from the group consisting of hydrogen, methyl, and ethyl groups, wherein $R_4$ is selected from the group consisting of N-alkyl substituted amide, N,N-dialkyl substituted amide, carboxyl alkylene amine, carboxyl alkylene methyl amine, carboxyl alkylene dimethyl amine, pyrrolidonyl, formamide, and acetamido groups, wherein an alkyl group of the N-alkyl substituted amide is selected from the group consisting of methyl, ethyl, and propyl groups, wherein an alkyl group of the N,N-dialkyl substituted amide is selected from the group consisting of methyl and ethyl groups, and wherein an alkylene group of the $R_4$ includes 1 to 5 carbon atoms; and (c) from about 3% to about 15% of a third monomer by total weight of the monomers, the third monomer being generally represented by the following formula:

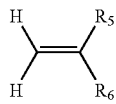

wherein $R_5$ is selected from the group consisting of hydrogen and methyl groups, and wherein $R_6$ is selected from the group consisting of amide, nitrile, acetyl, and pyridinyl groups. The terpolymer may be prepared using a polymerization method known in the art such as a free radical technique in a solution, a suspension, or an emulsion environment. Suitable polymerization methods are disclosed in U.S. Pat. No. 3,547,899, which is incorporated by reference herein in its entirety. The molecular weight of the resulting terpolymer may range, e.g., from about one hundred thousand to about one million or more. The terpolymer is soluble in the water-based fluid. The amount of terpolymer present in the wellbore servicing fluid may range from about 0.05 weight % (wt. %) to about 3 wt. %, alternatively from about 0.1 wt. % to about 2.5 wt. %, or from about 0.15 wt. % to about 2.0 wt. %. all weight percentages being based on the total weight of the wellbore servicing fluid.

In an embodiment, the first monomer comprises 2-acrylamido-2-methylpropanesulfonic acid or an alkali salt thereof such as sodium 2-acrylamido-2-methylpropanesulfonate (Na-AMPS), the second monomer comprises N-vinyl-2-pyrrolidone (NVP), and the third monomer comprises acrylamide. Other suitable examples of the first monomer include but are not limited to vinyl sulfonic acid, alkali salts of vinyl sulfonic acid, vinyl benzene sulfonic acid, alkali salts of vinyl benzene sulfonic acid, allyl sulfonic acid, alkali salts of allyl sulfonic acid, methallyl sulfonic acid, alkali salts of methallyl sulfonic acid, 3-methacrylamido-2-hydroxypropyl sulfonic acid, alkali salts of 3-methacrylamido-2-hydroxypropyl sulfonic acid, and combinations of two or more thereof; and the alkali salts are salts of a cation selected from the group consisting of sodium, potassium, and ammonium. Other suitable examples of the second monomer include but are not limited to N,N-dimethylacrylamide, N-vinylacetamide, dimethylamino ethyl methacrylate, N-methyl (meth) acrylamide, N-ethyl (meth)

acrylamide, N-propyl (meth) acrylamide, N-vinyl formamide, and combinations of two or more thereof. Other suitable examples of the third monomer include but are not limited to methacrylamide, acrylonitrile, methacrylonitrile, vinylacetate, vinylpyridine, and combinations of any two or more thereof.

The terpolymer can improve fluid loss from the wellbore servicing fluid by increasing the viscosity of the fluid. However, the viscosity of the wellbore servicing fluid remains sufficiently low to allow it to be pumped or poured to a desired location. Further, the terpolymer has a relatively high thermal stability and thus most likely will not decompose when it encounters relatively high temperatures and/or pressures down in a wellbore. For example, some wellbores may have downhole temperatures as high as about 450° F. and/or downhole pressures as high as about 30,000 psi. Therefore, the terpolymer is capable of reducing the fluid loss from the wellbore servicing fluid even when it is subjected to such high temperatures and/or pressures.

The wellbore servicing fluid may include additional additives as deemed appropriate by one skilled in the art. Such additives may vary depending on the intended use of the fluid in the wellbore. For example, when the wellbore servicing fluid is to be used as a drilling fluid, it may also include clay. Examples of suitable clays include but are not limited to montmorillonite clay such as sodium montmorillonite (or bentonite), attapulgite clay (or fuller's earth), sepiolite clay, and combinations thereof. Attaplugite clay is a fibrous clay rich in magnesium that has a needle-like structure. Sepiolite clay contains a mixture of fibrous clay and amorphous clay and also has a needle-like structure. It is believed that the use of such clay in combination with the previously described terpolymer improves the fluid loss of the drilling fluid even more than using the terpolymer without the clay. An amount of the clay present in the drilling fluid may range from about 0.5 wt. % to about 10 wt. %, alternatively from about 0.75 wt. % to about 7.5 wt. %, or from about 1 wt. % to about 5 wt. %, all weight percentages being based on the total weight of the drilling fluid. Examples of other additives that the wellbore servicing fluid may contain include but are not limited to weighting agents, suspending agents, and conditioning agents, oxidation and corrosion inhibitors, bacteriacides, thinners, and so forth.

The foregoing wellbore servicing fluid may be prepared by adding the previously described terpolymer to the water-based fluid or vice versa, or the two may be combined together at the same time. If the wellbore servicing fluid contains other additives such as clay, the terpolymer may be combined with the additives before combining the terpolymer/additive mixture with the water-based fluid, or the additives may be separately combined with the water-based fluid. The terpolymer, the water-based fluid, and any other additives may be blended together using any suitable mixing device.

In an embodiment, the terpolymer is combined with the water-based fluid after determining that the downhole temperatures and/or pressures in the wellbore would render conventional fluid loss control agents unstable. As such, the introduction of the terpolymer to the water-based fluid may be performed at an on-site location near the wellbore into which it is to be used. If desired, the terpolymer and the water-based fluid thus may be combined immediately prior to pumping the resulting wellbore servicing fluid into the wellbore.

The wellbore servicing fluid containing the water-based fluid and the terpolymer can be used in oil filed operations by those skilled in the art. In particular, the wellbore servicing fluid can be displaced into a wellbore and used to service the wellbore in accordance with procedures known to those skilled in the art. For example, when the intended use of the wellbore servicing fluid is as a drilling fluid, the fluid can be circulated down through a hollow drill stem and out through a drill bit attached thereto while rotating the drill stem to thereby drill the wellbore. The drilling fluid can be flowed back to the surface to deposit a filter cake on the walls of the wellbore and to carry drill cuttings to the surface. Generally, the wellbore servicing fluid can be used in wellbores having a temperature in the range of from about 50° F. to about 450° F. and a pressure of less than about 30,000 psi.

The presence of the terpolymer in the wellbore servicing fluid reduces the fluid loss from the servicing fluid in wellbores having a temperature in the range of from about 50° F. to about 450° F. and a pressure of less than about 30,000 psi. For example, the fluid loss may be reduced by from about 50% to about 99% when 2.0 wt. % terpolymer (made from a mixture of 91 wt. % Na-AMPS, 5.5 wt. % NVP, and 3.5 wt. % acrylamide) by weight of the final servicing fluid is mixed into a fluid containing about 35 wt. % fresh water and about 65 wt. % K-formate brine (density of the brine is 13.2 lbs/gal) before circulating the terpolymer-containing servicing fluid into the wellbore. In this case, the fluid loss reduction is calculated using the following equation:

$$\% \text{ Fluid Loss Reduction} = ((\text{FL of the fluid before the terpolymer is added} - \text{FL of the fluid after the terpolymer is added})/\text{FL of the fluid before the terpolymer is added}) \times 100,$$

where "FL" stands for fluid loss. The fluid loss measurements can be performed according to the "Recommended Practice Standard Procedure for Field Testing Water Based Drilling Fluids," API Recommended practice 13B-1 (RP 13B-1) published by the American Petroleum Institute.

EXAMPLES

The invention having been generally described, the following examples are given as particular embodiments of the invention and to demonstrate the practice and advantages thereof. It is understood that the examples are given by way of illustration and are not intended to limit the specification or the claims to follow in any manner.

It should be pointed out that all equipment used in the following examples and tests performed are described in the aforementioned RP13B-1 published by the American Petroleum Institute.

Example 1

This example shows that in a water-based fluid containing a high concentration of K-formate, a terpolymer (Terpoly-1) made from a mixture of 91 wt. % Na-AMPS, 5.5 wt. % NVP, and 3.5 wt. % acrylamide provides improved fluid loss control. The procedure followed in this example first involved mixing together five fluid samples (samples 1–5) in five separate pint jars using a Multimixer (Model: 9B with 9B29X impeller). Samples 1 and 3 contained Terpoly-1, whereas control samples 2 and 4 contained conventional fluid loss control agent (Terpoly-2), and control sample 5 contained no synthetic polymer. The relative amounts and descriptions of the materials in each sample are provided in Table 1A below. The materials are listed according to the order in which they were mixed. After the addition of each material, the sample was mixed for the period of time shown in Table 1A.

After the mixing described above, each sample was tested immediately at 100° F. in accordance with the RPl13B-1. Samples 1 and 2 were tested only for apparent viscosity (AV), whereas samples 3, 4, and 5 were tested for AV, plastic viscosity (PV), yield point (YP), gel strength (Gels), and fluid loss at low-temperature/low-pressure (FL). The results of the tests performed are shown in Table1B below. The fluid loss of sample 3, which contained a terpolymer as described herein was only 1.1 mL. In contrast, control samples 4 and 5 exhibited much higher amounts of fluid loss (i.e., more than 100 mL) than sample 1. Further, sample 3 has significantly higher AV and PV than control samples 2 and 3. However, in plain tap water, the sample with Terpoly-1 (sample 1) has much lower (viscosity than sample 2, which contained a terpolymer as described in U.S. Pat. No. 6,124,245.

(samples 6–8) in three separate pint jars using the Multimixer. Sample 6 contained Terpoly-1, whereas samples 7 and 8 contained conventional fluid loss control agents (Terpoly-2 and Copoly-1, respectively) and thus served as control samples. The relative amounts and descriptions of the materials in each sample are provided in Table 2A below. The materials are listed according to the order in which they were mixed. After the addition of each material, the sample was mixed for the period of time shown in Table 2A.

After the mixing described above, each sample was initially tested for PV, YP, and Gels at 95° F. Next, the fluid samples were transferred to heat aging cells, and the cells were rolled about 4 hours in an oven at 250° F. The cells were then aged in an oven at 400° F. for about 16 hours. After allowing the cells to cool to about 95° F., the fluid samples were stirred another 5 minutes on the Multimixer, and they were tested for PV, YP, Gels, and FL in accordance with RP13B-1. The results of the tests performed after aging are shown in Table 2B below. The fluid loss of sample 6,

TABLE 1A

| Materials | Mixing Time, minutes | Sample 1 | Sample 2 | Sample 3 | Sample 4 | Sample 5 |
|---|---|---|---|---|---|---|
| Wellform 13.2, g | — | — | — | 130 | 130 | 130 |
| Tap water, mL | 1 | 200 | 200 | 70 | 70 | 70 |
| Gem GP Glycol, mL | 1 | — | — | 5 | 5 | 5 |
| Polymer, g | 20 | Terpoly-1, 2.50 | Terpoly-2, 2.50 | Terpoly-1, 3.50 | Terpoly-2, 3.50 | None |
| Bentonite, g | 1 | — | — | 8 | 8 | 8 |
| Rev dust, g | 60 | — | — | 12 | 12 | 12 |

Wellform 13.2: A K-formate solution available from Albemarle Corp. and having a density of 13.2 pounds per gallon
Gem GP Glycol: A glycol available from Baroid Drilling Fluids, Inc.
Bentonite: Simulates drill cuttings
Rev dust: Simulates drill cuttings
Terpoly-1: A terpolymer prepared by polymerizing a mixture of 91 wt. % Na-AMPS, 5.5 wt. % NVP, and 3.5 wt. % acrylamide, all weight percentages being by total weight of the monomers
Terpoly-2: A terpolymer prepared by polymerizing a mixture of 50 wt. % Na-AMPS, 5 wt. % NVP, and 45 wt. % acrylamide as described in U.S. Pat. No. 6,124,245, all weight percentages being by total weight of the monomers

TABLE 1B

| Property | Sample 1 | Sample 2 | Sample 3 | Sample 4 | Sample 5 |
|---|---|---|---|---|---|
| 600 | 72 | 122 | 32 | 16 | 13 |
| 300 | | | 16 | 8 | 6 |
| AV | 36 | 61 | 16 | 8 | 6.5 |
| PV | | | 16 | 8 | 7 |
| YP | | | 00 | 0 | −1 |
| Gels | | | 1/1 | 1/1 | 1/1 |
| FL | | | 1.3 | 117.0 | 146.0 |

AV: The apparent viscosity in centipoises
PV: The plastic viscosity in centipoises
YP: The yield point in lb/100 ft$^2$
Gels: The 10-second and 10-minute gel strengths in lb/100 ft$^2$
FL: The fluid loss in mL/30 min. at 100° F. and 100 psi Example 2

This example shows that in a water-based fluid containing a high concentration of K-formate, a terpolymer (Terpoly-1) made from a mixture of 91 wt. % Na-AMPS, 5.5 wt. % NVP, and 3.5 wt. % acrylamide provides improved fluid loss control at high temperatures. The procedure followed in this example first involved mixing together three fluid samples which contained Terpoly-1 as described herein was only 4.9 mL. In contrast, control samples 7 and 8 exhibited much higher amounts of fluid loss (i.e., more than 20 mL) than sample 9.

TABLE 2A

| Materials | Mixing Time, Minutes | Sample 6 | Sample 7 | Sample 8 |
|---|---|---|---|---|
| Wellform 13.2, g | — | 265 | 265 | 265 |
| Tap water, mL | 1 | 80 | 80 | 80 |
| Polymer, 6.4 g | 10 | Terpoly-1 | Terpoly-2 | Copoly-1 |
| Gem GP Glycol, mL | 1 | 8 | 8 | 8 |
| Magnesium oxide, g | 5 | 0.4 | 0.4 | 0.4 |
| Flowzan, g | 20 | 1.2 | 1.2 | 1.2 |
| Bentonite, g | 1 | 4 | 4 | 4 |
| Rev dust, g | 10 | 8 | 8 | 8 |
| Ultracarb 12, g | 10 | 20 | 20 | 20 |

MgO: Used to control pH
Flowzan: A xanthan gum available from Drilling Specialties Company LLC
Ultracarb 12: Sized calcium carbonates available from TBC-BRINADD TABLE 2A-continued

| Materials | Mixing Time, Minutes | Sample 6 | Sample 7 | Sample 8 |
|---|---|---|---|---|

Copoly-1: A copolymer prepared by polymerizing a mixture of 90 wt. % Na-AMPS and 10 wt. % acrylamide, all weight percentages being by total weight of the monomers
For other nomentclature, see Table 1A.

TABLE 2B

| Property | Sample 6 | Sample 7 | Sample 8 |
|---|---|---|---|
| 600 | 21 | 187 | 82 |
| 300 | 21 | 121 | 45 |
| PV | 21 | 66 | 37 |
| YP | 00 | 55 | 8 |
| Gels | 1/1 | 3/3 | 1/2 |
| FL | 4.9 | 27.2 | 23.8 |

For nomenclature, see Table 1B.

Example 3

This example shows that in a water-based fluid containing a high concentration of K-formate, a terpolymer (Terpoly-3) made from 80 wt. % Na-AMPS, 10 wt. % NVP, and 10 wt. % acrylamide provides improved fluid loss control at high temperatures when used in conjunction with attapulgite clay. The procedure followed in this example first involved mixing together three fluid samples (samples 9–11) in three separate pint jars using the Multimixer. Sample 9 contained Terpoly-3 and attapulgite clay, sample 10 contained Terpoly-3 but no attapulgite clay, and sample 11 contained attapulgite clay but no Terpoly-3. The relative amounts and descriptions of the materials in each sample are provided in Table 3A below. The materials are listed according to the order in which they were mixed. After the addition of each material, the sample was mixed for the period of time shown in Table 3A.

After the mixing described above, each sample was initially tested for PV, YP, and Gels at 95° F. Next, the fluid samples were transferred to heat aging cells, and the cells were rolled about 4 hours in an oven at 250° F. The cells were then aged in an oven at 400° F. for about 16 hours. After allowing the cells to cool to about 95° F., the fluid samples were stirred another 5 minutes on the Multimixer, and they were tested for PV, YP, Gels, FL, and fluid loss at high-temperature/high-pressure (HPHTFL) in accordance with the RP13B-1. The results of the tests performed after aging are shown in Table 3B below. After aging at 400° F., the FL and HPHTFL were only 1.1 mL and 12.0 mL, respectively, for sample 9, which contained attapulgite clay and a terpolymer as described herein. Sample 10, which contained a terpolymer as described herein but no attapulgite clay, exhibited a FL of 9.0 mL, and sample 11, which contained attapulgite clay but no synthetic polymer, exhibited a FL of 131 mL and a HPHTFL of over 250 mL.

TABLE 3A

| Materials | Mixing Time, minutes | Sample 9 | Sample 10 | Sample 11 |
|---|---|---|---|---|
| Wellform 13.2, g | — | 265 | 265 | 265 |
| Tap water, mL | 1 | 80 | 80 | 80 |
| Attapulgite, g | 10 | 6 | 0 | 6 |
| Gem GP Glycol, mL | 1 | 8 | 8 | 8 |
| Flowzan, g | 10 | 1.2 | 1.2 | 1.2 |
| Terpoly-3, g | 5 | 6.4 | 6.4 | 0.0 |
| Magnesium oxide, g | 5 | 0.4 | 0.4 | 0.4 |
| Bentonite, g | 1 | 4 | 4 | 4 |
| Rev dust, g | 10 | 8 | 8 | 8 |
| Ultracarb 12, g | 10 | 20 | 20 | 20 |

Terpoly-3: A terpolymer prepared by polymerizing a mixture of 80 wt. % Na-AMPS, 10 wt. % NVP, and 10 wt. % acrylamide, all weight percentages being by total weight of the monomers
For other nomenclature, see Table 1A.

TABLE 3B

| Property | Sample 9 | Sample 10 | Sample 11 |
|---|---|---|---|
| 600 | 123 | 119 | 20 |
| 300 | 75 | 72 | 11 |
| PV | 48 | 47 | 9 |
| YP | 27 | 25 | 2 |
| Gels | 2/3 | 2/2 | 4/6 |
| FL | 1.1 | 9.0 | 131 |
| HPHTFL | 12.0 | Not Tested | >250 |

HPHTFL: The fluid loss in mL/30 minutes at 300° F. and 500 psi
For other nomenclature, see Table 1B.

Example 4

This example shows that in a water-based fluid containing a high concentration of K-formate, a terpolymer (Terpoly-3) made from 80 wt. % Na-AMPS, 10 wt. % NVP, and 10 wt. % acrylamide provides better fluid loss control than a copolymer and a tetrapolymer. The procedure followed in this example first involved mixing together three fluid samples (samples 12–14) in three separate pint jars using the Multimixer. Sample 12 contained Terpoly-3, whereas samples 13 and 14 contained conventional fluid loss control agents (Tetrapoly-1 and Copoly-2, respectively) and thus served as control samples. The relative amounts and descriptions of the materials in each sample are provided in Table 4A below. The materials are listed according to the order in which they were mixed. After the addition of each material, the sample was mixed for the period of time shown in Table 4A.

After the mixing described above, each sample was initially tested for PV, YP, and Gels at 95° F. Next, the fluid samples were transferred to heat aging cells, and the cells were rolled about 4 hours in an oven at 250° F. The cells were then aged in an oven at 400° F. for about 16 hours. After allowing the cells to cool to about 95° F., the fluid samples were stirred another 5 minutes on the Multimixer, and they were tested for PV, YP, Gels, FL, and HPHTFL in accordance with the RP13B-1. The results of the tests performed after aging are shown in Table 4B below. After aging at 400° F., sample 12, which contained a new terpolymer as described herein, yielded the lowest HPHTFL, i.e., 11.8 mL, and a low FL of 1.1 mL. Sample 13, which contained Tetrapoly-1, exhibited the same FL as sample 12 but a higher HPHTFL of 15.6. Further, sample 14, which contained Copoly-2, exhibited a much higher FL than samples 12 and 13.

TABLE 4A

| Materials | Mixing Time, minutes | Sample 12 | Sample 13 | Sample 14 |
|---|---|---|---|---|
| Wellform 13.2, g | — | 283 | 283 | 283 |
| Tap water, mL | 1 | 80 | 80 | 80 |
| Attapulgite, g | 10 | 6 | 6 | 6 |
| Gem GP Glycol, mL | 1 | 8 | 8 | 8 |
| Flowzan, g | 10 | 1.2 | 1.2 | 1.2 |
| Polymer, 6.4 g | 5 | Terpoly-3 | Tetrapoly-1 | Copoly-2 |
| Magnesium oxide, g | 5 | 0.4 | 0.4 | 0.4 |
| Bentonite, g | 1 | 4 | 4 | 4 |
| Rev dust, g | 20 | 8 | 8 | 8 |

Tetrapoly-1: A tetrapolymer prepared by polymerizing a mixture of 70 wt. % Na-AMPS, 15 wt. % NVP, 10 wt. % acrylamide, and 5 wt, % Na-acrylate as disclosed in U.S. Pat. No. 5,380,705, all weight percentages being by total weight of the monomers
Copoly-2: A copolymer prepared by polymerizing a mixture of 90 wt. % Na-AMPS and 10 wt. % NVP, all weight percentages being by total weight of the monomers
For other nomenclature, see Tables 1A and 3A.

TABLE 4B

| Property | Sample 12 | Sample 13 | Sample 14 |
|---|---|---|---|
| 600 | 91 | 81 | 37 |
| 300 | 54 | 46 | 24 |
| PV | 37 | 35 | 13 |
| YP | 17 | 11 | 11 |
| Gels | 3/4 | 1/2 | 5/11 |
| FL | 1.1 | 1.1 | >100 |
| HPHTFL | 11.8 | 15.6 | Not Tested |

For nomenclature, see Tables 1B and 3B.

Example 5

This example shows that in a water-based fluid containing a high concentration of KCl salt, terpolymers made from Na-AMPS, NVP, and acrylamide provide improved fluid loss control at high temperatures. The procedure followed in this example first involved mixing together four fluid samples (samples 15–18) in four separate quart jars using a Multimixer. Samples 15 and 16 contained Terpoly-1 and Terpoly-4, respectively, whereas control sample 17 contained no synthetic polymers, and control sample 18 contained a conventional fluid loss control agent (Copoly-2). The relative amounts and descriptions of the materials in each sample are provided in Table 5A below. The materials are listed according to the order in which they were mixed. After the addition of each material, the sample was mixed for the period of time shown in Table 5A.

After the end of the mixing described above, each sample was initially tested for PV, YP, and Gels at 95° F. Next, the fluid samples were transferred to heat aging cells, and the cells were aged in an oven at 300° F. for about 16 hours. After allowing the cells to cool to about 100° F., the fluid samples were stirred another 10 minutes on the Multimixer, and they were tested for PV, YP, Gels, FL, and HPHTFL in accordance with the RP13B-1. The results of the tests performed after aging are shown in Table 4B below. Samples 15 and 16, which contained the new terpolymers described herein, yielded improved HPHTFL values, i.e., 22.0 mL and 27.6 mL, respectively, as compared to sample 17, which contained no synthetic polymers and sample 18, which contained Copoly-2.

TABLE 5A

| Materials | Mixing Time, Minutes | Sample 15 | Sample 16 | Sample 17 | Sample 18 |
|---|---|---|---|---|---|
| Tap Water, mL | | 225 | 225 | 225 | 225 |
| Bentonite, g | 20 | 3 | 3 | 3 | 3 |
| Aqueous Solution Containing 50 wt. % NaOH by volume of the solution, mL | 5 | 0.25 | 0.25 | 0.25 | 0.25 |
| KCl, g | 5 | 28 | 28 | 28 | 28 |
| Na-lignite, g | 5 | 5 | 5 | 5 | 5 |
| Polymer, 5 g | 10 | Terpoly-1 | Terpoly-4 | None | Copoly-2 |
| Barite, g | 20 | 420 | 420 | 420 | 420 |
| 50% w/v NaOH, mL | 10 | 1 | 1 | 1 | 1 |
| Rev dust, g | 20 | 15 | 15 | 15 | 15 |

Terpoly-4: A terpolymer prepared by polymerizing a mixture of 93 wt. % Na-AMPS, 5.3 wt. % NVP, and 1.7 wt. % acrylamide, all weight percentages being by total weight of the monomers
Barite: A weighting agent
For other nomenclature, see Tables 1A and 4A.

TABLE 5B

| Property | Sample 15 | Sample 16 | Sample 17 | Sample 18 |
|---|---|---|---|---|
| 600 | 161 | 154 | 26 | 188 |
| 300 | 91 | 86 | 13 | 116 |
| PV | 70 | 68 | 13 | 72 |
| YP | 21 | 18 | 0 | 44 |
| Gels | 3/5 | 3/4 | 3/8 | 7/13 |
| FL | 3.5 | 3.4 | 118 | 3.0 |
| HPHTFL | 22.0 | 27.6 | >500 | >125 |

For nomenclature, see Tables 1B and 3B.

Example 6

This example also shows that in a water-based fluid containing a very high concentration of KCl salt, terpolymers made from Na-AMPS, NVP, and acrylamide provide improved fluid loss control at high temperatures. The procedure followed in this example first involved mixing together six fluid samples (samples 19–24) in six separate quart jars using the Multimixer. Samples 19, 20, and 21 contained Terpoly-1, Terpoly-3, and Terpoly-5, respectively, whereas control sample 22 contained no synthetic polymers, and control samples 23 and 24 contained conventional fluid loss control agents. (Tetrapoly-1 and THERMACHECK polymer available from Baroid Drilling Fluids, Inc.). The relative amounts and descriptions of the materials in each sample are provided in Table 6A below. The materials are listed according to the order in which they were mixed. After the addition of each material, the sample was mixed for the period of time shown in Table 6A.

After the mixing described above, each sample was initially tested for PV, YP, and Gels at 95° F. Next, the fluid samples were transferred to heat aging cells, and the cells were aged in an oven at 350° F. for about 16 hours. After allowing the cells to cool to about 100° F., the fluid samples were stirred another 10 minutes on the Multimixer, and they were tested for PV, YP, Gels, and HPHTFL in accordance with RP13B-1. The results of the tests performed after aging are shown in Table 6B below. Samples 19, 20, and 21, which contained the new terpolymers described herein, yielded the lowest HPHTFL values, i.e., 15.8 mL, 15.8 mL, and 16.0 mL, respectively. Sample 23, which contained Tetrapoly-1, had a slightly higher HPHTFL of 18, and sample 24, which contained THERMACHECK polymer, had an even higher HPHTFL of 25.6. The HPHTFL of sample 22, which contained no synthetic polymers, was much higher that that of the other samples, i.e., greater than 500 mL.

TABLE 6A

| Materials | Mixing Time, minutes | Sample 19 | Sample 20 | Sample 21 | Sample 22 | Sample 23 | Sample 24 |
|---|---|---|---|---|---|---|---|
| Tap Water, mL | | 225 | 225 | 225 | 225 | 225 | 225 |
| Bentonite, g | 20 | 3 | 3 | 3 | 3 | 3 | 5 |
| 50% w/v NaOH, mL | 5 | 0.25 | 0.25 | 0.25 | 0.25 | 0.25 | 0.25 |
| KCl, g | 5 | 35 | 35 | 35 | 35 | 35 | 35 |
| Na-lignite, g | 5 | 5 | 5 | 5 | 5 | 5 | 5 |
| Polymer | 10 | Terpoly-1 (6 grams) | Terpoly-3 (6 grams) | Terpoly-5 (6 grams) | None | Tetrapoly-1 (6 grams) | Thermacheck (7.5 grams) |
| Barite, g | 10 | 420 | 420 | 420 | 420 | 420 | 420 |
| 50% w/v NaOH, mL | 10 | 1.25 | 1.25 | 1.25 | 1.25 | 1.25 | 1.25 |
| Rev dust, g | 20 | 15 | 15 | 15 | 15 | 15 | 15 |

Bentonite: Na-Montmorrilonite is used as a viscosifier
Terpoly-5: A terpolymer prepared by polymerizing a mixture of 85 wt. % Na-AMPS, 10 wt, % NVP, and 5 wt. % acrylamide, all weight percentages being by total weight of the monomers
Thermacheck: A synthetic polymer for HPHTFL control available from Baroid Drilling Fluids
For other nomenclature, see Tables 1A, 4A, and 5A.

TABLE 6B

| Property | Sample 19 | Sample 20 | Sample 21 | Sample 22 | Sample 23 | Sample 24 |
|---|---|---|---|---|---|---|
| 600 | 175 | 242 | 238 | 28 | 163 | 108 |
| 300 | 99 | 143 | 139 | 14 | 93 | 57 |
| PV | 76 | 99 | 99 | 14 | 70 | 51 |
| YP | 23 | 44 | 40 | 00 | 2/3 | 6 |
| Gels | 3.5/5 | 4/6 | 4/6 | 3/6 | 3/4 | 1/2 |
| HPHTFL | 15.8 | 15.8 | 16.0 | >500 | 18.0 | 25.6 |

For nomenclature, see Tables 1B and 3B.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Use of the term "optionally" with respect to any element of a claim is intended to mean that the subject element is required, or alternatively, is not required. Both alternatives are intended to be within the scope of the claim. Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The discussion of a reference in the Description of Related Art is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A method for reducing fluid loss from a wellbore servicing fluid, comprising: combining a terpolymer with the wellbore servicing fluid to reduce the fluid loss from the fluid, the terpolymer being formed from the following monomers:
   (a) from 85% to about 95% of 2-acrylamido-2-methylpropanesulfonic acid or an alkali salt thereof;
   (b) from about 3% to less than 10% of N-vinyl-2-pyrrolidone; and
   (c) from about 3% to 5% of acrylamide.

2. The method of claim 1, further comprising displacing the wellbore servicing fluid comprising the terpolymer into a wellbore in contact with the subterranean formation.

3. The method of claim 1, wherein the alkali salt of the 2-acrylamido-2-methylpropanesulfonic acid comprises sodium 2-acrylamido-2-methylpropanesulfonate.

4. The method of claim 1, wherein the wellbore servicing fluid comprises a drilling fluid, a work-over fluid, a fracturing fluid, a sweeping fluid, or combinations thereof.

5. The method of claim 1, wherein an amount of the terpolymer present in the wellbore servicing fluid is in a range of from about 0.05 wt. % to about 3.0 wt. % based on a total weight of the wellbore servicing fluid.

6. The method of claim 1, wherein an amount of the terpolymer present in the wellbore servicing fluid is in a range of from about 0.1 wt. % to 2.5 wt. % based on a total weight of the wellbore servicing fluid.

7. The method of claim 1, wherein an amount of the terpolymer present in the wellbore servicing fluid is in a range of from about 0.15 wt. % to 2.0 wt. % based on a total weight of the wellbore servicing fluid.

8. The method of claim 1, wherein the wellbore servicing fluid comprises water.

9. The method of claim 1, wherein the wellbore servicing fluid comprises an aqueous salt solution.

10. The method of claim 9, wherein the aqueous salt solution comprises NaCl, KCl, KNO$_3$, sea salt, Na-formate, K-formate, Cs-formate, or combinations thereof.

11. The method of claim 1, wherein the wellbore servicing fluid comprises clay.

12. The method of claim 11, wherein the clay comprises montmorillonite clay, attapulgite clay, sepiolite clay, or combinations thereof.

13. The method of claim 12, wherein the montmorillonite clay comprises bentonite.

14. The method of claim 2, wherein the wellbore has a temperature in a range of from about 50° F. to about 450° F.

15. The method of claim 2, wherein the wellbore has a pressure of less than or equal to about 30,000 psi.

16. The method of claim 1, wherein the fluid loss is reduced by from about 50% to about 99% when 2.0 wt. % of the terpolymer by weight of the wellbore servicing fluid is combined with a fluid containing about 35 wt. % fresh water and about 65 wt. % K-formate brine, and wherein the terpolymer comprises about 91 wt. % Na-AMPS monomer, 5.5 wt. % NYP monomer, and 3.5 wt. % acrylarnide monomer.

* * * * *